UNITED STATES PATENT OFFICE.

ALBERT LANG, OF KARLSRUHE, GERMANY.

PROCESS FOR THE PRODUCTION OF REACTIONARY SUBSTANCES FOR THE GENERATION OF HEAT.

1,035,202.     Specification of Letters Patent.     Patented Aug. 13, 1912.

No Drawing.     Application filed October 19, 1908. Serial No. 458,490.

*To all whom it may concern:*

Be it known that I, ALBERT LANG, a subject of the Grand Duke of Baden, residing at Karlsruhe, in Baden, Germany, have invented new and useful Improvements in Processes for the Production of Reactionary Substances for the Generation of Heat, of which the following is a specification.

My improved process comprises the mixing in equivalent proportions of a metal such as iron and sulfur; the heat liberated by the combination of these substances being applied for the heating of solid, liquid or gaseous materials, by placing the preparation within an inclosed vessel surrounded by the solid, liquid or gaseous substance which is to be heated.

In carrying my invention into effect I mix the ingredients and form them into a solid mass or cake. This is preferably effected by fusing or melting the sulfur at a temperature below its ignition point, and stirring into it the requisite quantity of finely divided metallic iron filings or the like until the two elements are sufficiently intermingled, and allowing the compound to cool in suitable molds. The cakes thus formed are convenient to handle and are so firm after the sulfur has solidified that a breaking up during the carriage thereof is not likely to occur.

The ignition of the compound is effected by means of a preparation of greater combustibility such, for instance, as that employed for the heads of so called Swedish matches, the composition whereof is well known. The ignition having been occasioned by friction or otherwise of such a preparation, the cake or material is inclosed as aforesaid, and the exothermic reaction propagates itself throughout the entire mass. During the combining of the sulfur with the metallic iron, no gaseous products are evolved. The reaction can therefore be effected in a closed space such as a tube and the entire heat set free can be utilized by inclosing the tube in the material to be heated.

Having thus described my invention what I claim is:—

A process for the production of a reactionary substance composed of sulfur and iron for the purpose of generating heat, consisting in incorporating finely divided iron in molten sulfur in chemical equivalent quantities.

In testimony whereof I have signed my name to this specification in the presence of two subscribing witnesses.

ALBERT LANG.

Witnesses:
HANS UBERT,
ANNA HAUSER.